(12) United States Patent
Shimomura

(10) Patent No.: US 11,919,390 B2
(45) Date of Patent: Mar. 5, 2024

(54) IN-VEHICLE TRANSMISSION DEVICE AND MOBILE TERMINAL, AND LOADAGE INFORMATION DISPLAY SYSTEM INCLUDING SAME

(71) Applicant: NSK LTD., Tokyo (JP)

(72) Inventor: Yousuke Shimomura, Fujisawa (JP)

(73) Assignee: NSK LTD. (JP)

( * ) Notice: Subject to any disclaimer, the term of this patent is extended or adjusted under 35 U.S.C. 154(b) by 455 days.

(21) Appl. No.: 17/293,732

(22) PCT Filed: Nov. 7, 2019

(86) PCT No.: PCT/JP2019/043732
§ 371 (c)(1),
(2) Date: May 13, 2021

(87) PCT Pub. No.: WO2020/100721
PCT Pub. Date: May 22, 2020

(65) Prior Publication Data
US 2022/0016977 A1 Jan. 20, 2022

(30) Foreign Application Priority Data
Nov. 14, 2018 (JP) .................................. 2018-214035

(51) Int. Cl.
*B60K 35/00* (2006.01)
*G01G 19/12* (2006.01)
(Continued)

(52) U.S. Cl.
CPC ............. *B60K 35/00* (2013.01); *G01G 19/12* (2013.01); *H04W 4/48* (2018.02); *H04W 4/80* (2018.02);
(Continued)

(58) Field of Classification Search
CPC .............. B60K 35/00; B60K 2370/167; B60K 2370/573; B60K 2370/5911; G01G 19/12;
(Continued)

(56) References Cited

U.S. PATENT DOCUMENTS

| 6,157,889 A | 12/2000 | Baker |
| 2001/0047892 A1 | 12/2001 | Suzuki et al. |

(Continued)

FOREIGN PATENT DOCUMENTS

| CN | 102494750 A | 6/2012 |
| CN | 104019875 A | 9/2014 |

(Continued)

OTHER PUBLICATIONS

Third Notice of Reasons for Refusal issued in corresponding Chinese Application No. 201980075225.4 dated Oct. 17, 2023, with English translation (10 Pages).

(Continued)

*Primary Examiner* — Yuen Wong
(74) *Attorney, Agent, or Firm* — Harness, Dickey & Pierce, P.L.C.

(57) ABSTRACT

A mobile terminal includes a mobile communication unit for communicating with an in-vehicle signal-sending device, an input operation unit for inputting data, a computational processing unit for performing computational processing, a display unit for displaying a screen, a storage unit for storing screen display information, and a mobile control unit for controlling the display unit. The computational processing unit has a function for calculating a loadage deviation based on vehicle specifications and vehicle loadage information contained in a sensor signal from the mobile communication unit, the storage unit has a function for presetting the vehicle specifications, the loadage deviation, and the screen display information prepared to display the vehicle specifications (Continued)

and the loadage deviation on the display unit screen, and the mobile control unit has a function for causing the display unit to display at least the vehicle specifications and the loadage information based on the screen display information.

7 Claims, 8 Drawing Sheets

(51) Int. Cl.
  *H04W 4/48* (2018.01)
  *H04W 4/80* (2018.01)
(52) U.S. Cl.
  CPC .............. *B60K 35/28* (2024.01); *B60K 35/80* (2024.01); *B60K 35/85* (2024.01); *B60K 2360/167* (2024.01); *B60K 2360/573* (2024.01); *B60K 2360/5911* (2024.01)
(58) Field of Classification Search
  CPC ...... H04W 4/48; H04W 4/80; H04Q 2209/43; H04Q 9/00
  See application file for complete search history.

(56) References Cited

U.S. PATENT DOCUMENTS

| | | |
|---|---|---|
| 2002/0038193 A1 | 3/2002 | Grunberg et al. |
| 2014/0000969 A1 | 1/2014 | Carruthers et al. |
| 2018/0244187 A1 | 8/2018 | Strano et al. |
| 2019/0195679 A1* | 6/2019 | Maeda ................... B60T 8/172 |

FOREIGN PATENT DOCUMENTS

| | | |
|---|---|---|
| EP | 1167094 A1 | 1/2002 |
| JP | H05231913 A | 9/1993 |
| JP | H10100773 A | 4/1998 |
| JP | H11248525 A | 9/1999 |
| JP | 2001-330507 A | 11/2001 |
| JP | 2002-054983 A | 2/2002 |
| JP | 2009-257864 A | 11/2009 |
| JP | 2012-528316 A | 11/2012 |
| JP | 3197177 U | 4/2015 |
| KR | 10-10-1504573 B1 | 3/2015 |
| WO | 2001-020479 A1 | 3/2001 |
| WO | 2009-001705 A1 | 12/2008 |
| WO | 2010-136745 A1 | 12/2010 |

OTHER PUBLICATIONS

Notice of Second Office Action issued in corresponding Chinese Patent Application No. 201980075225.4 dated May 22, 2023, with English translation (21 Pages).

International Search Report (English and Japanese) of the International Searching Authority issued in PCT/JP2019/043732, dated Jan. 21, 2020; ISA/JP (7 pages).

First Notice of Reason for Refusal for corresponding Chinese Patent Application No. 201980075225.4 dated Nov. 2, 2022, with English translation (17 Pages).

Office Action issued in corresponding Chinese Patent Application No. 201980075225.4 dated Jan. 4, 2024, with English translation (9 Pages).

* cited by examiner

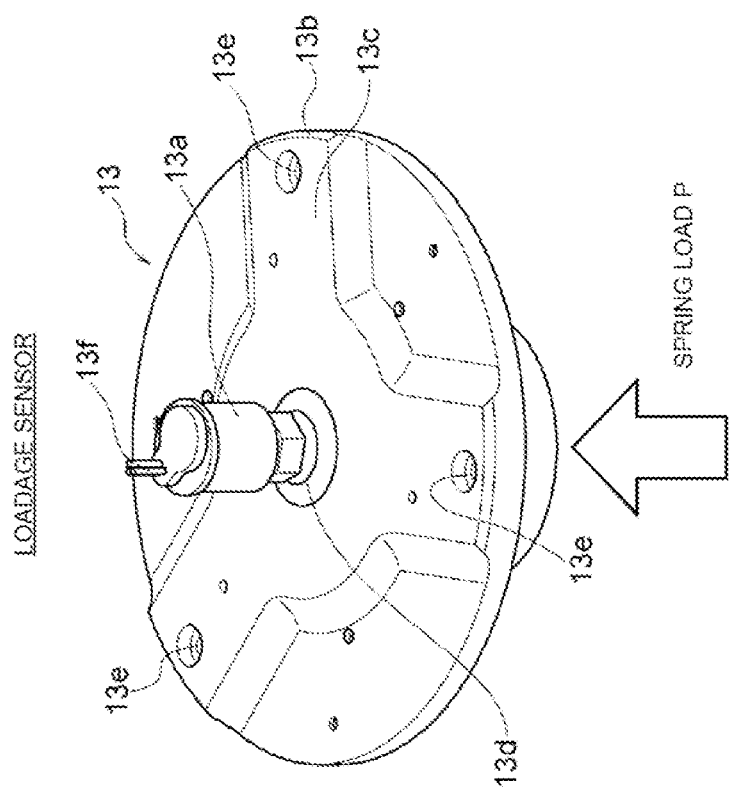

<VEHICLE SPECIFICATIONS>
L : WHEELBASE
$T_f$: FRONT TREAD
$T_r$: REAR TREAD

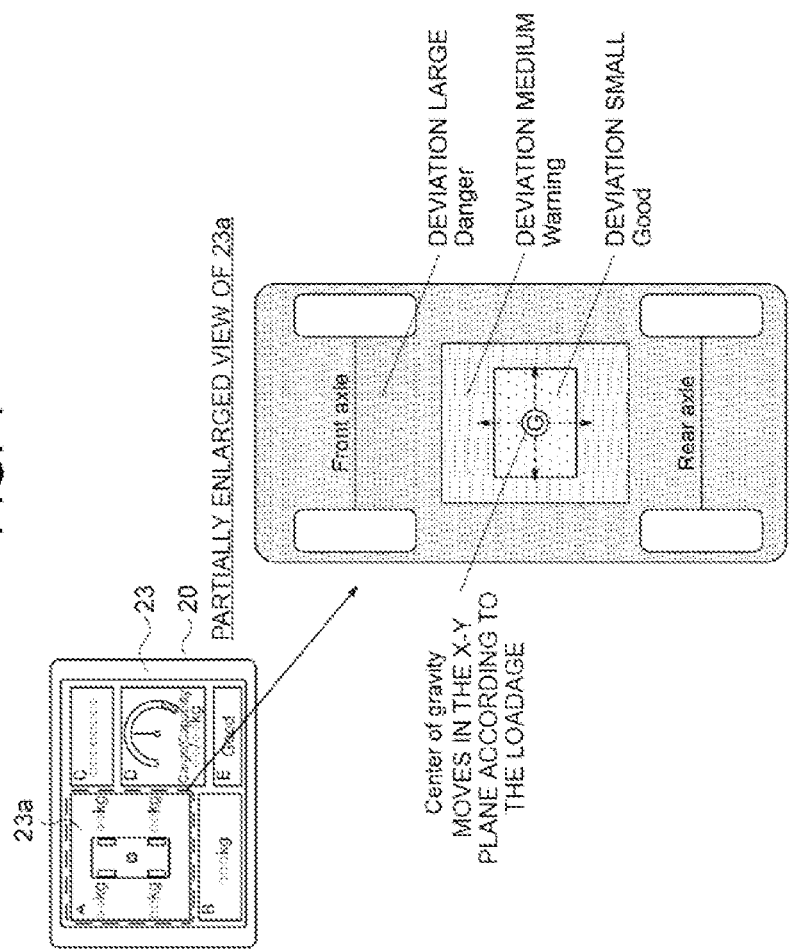

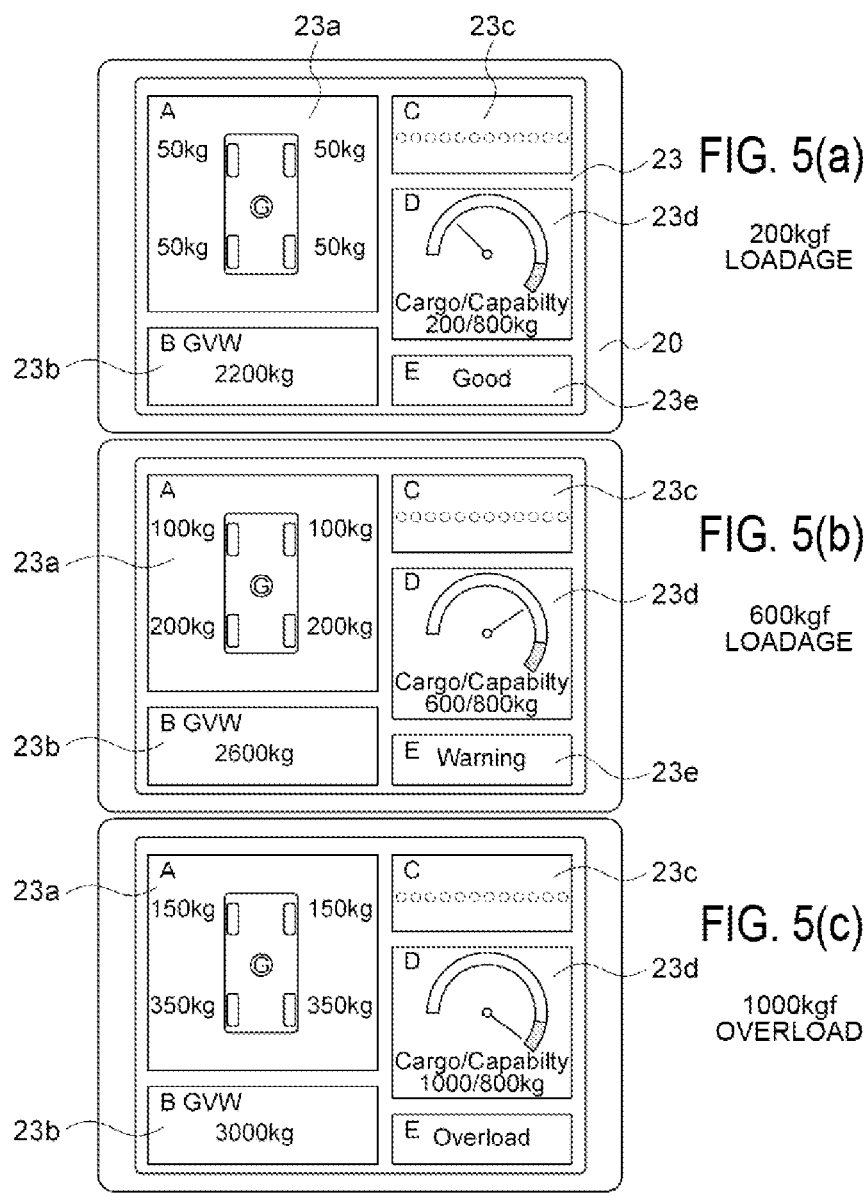

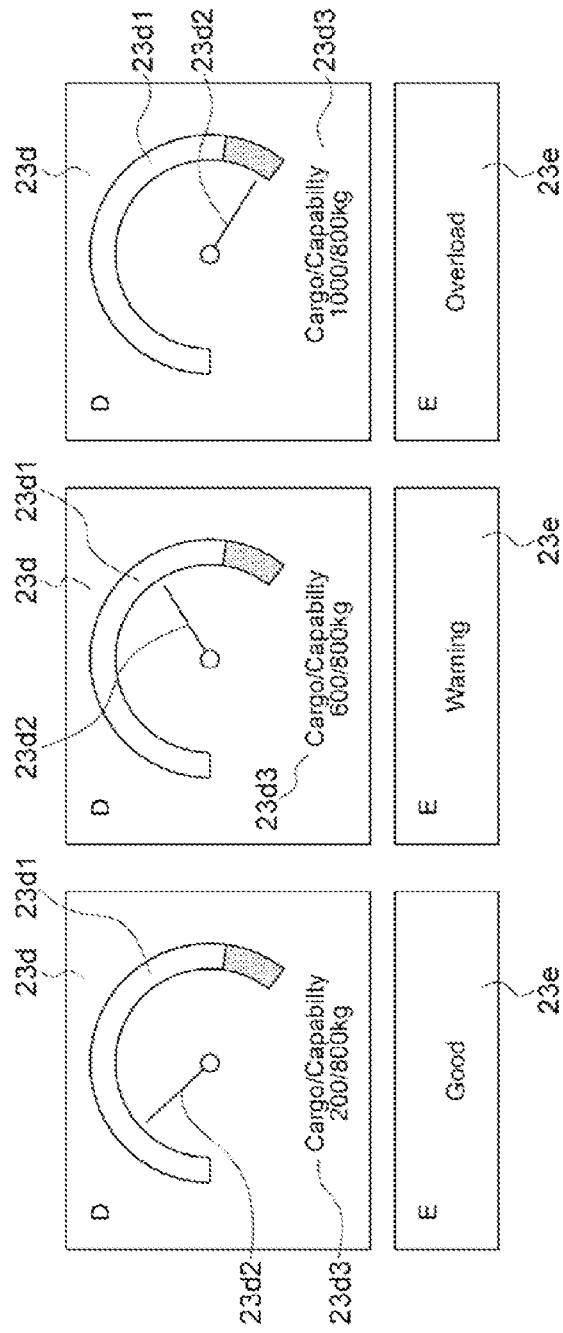

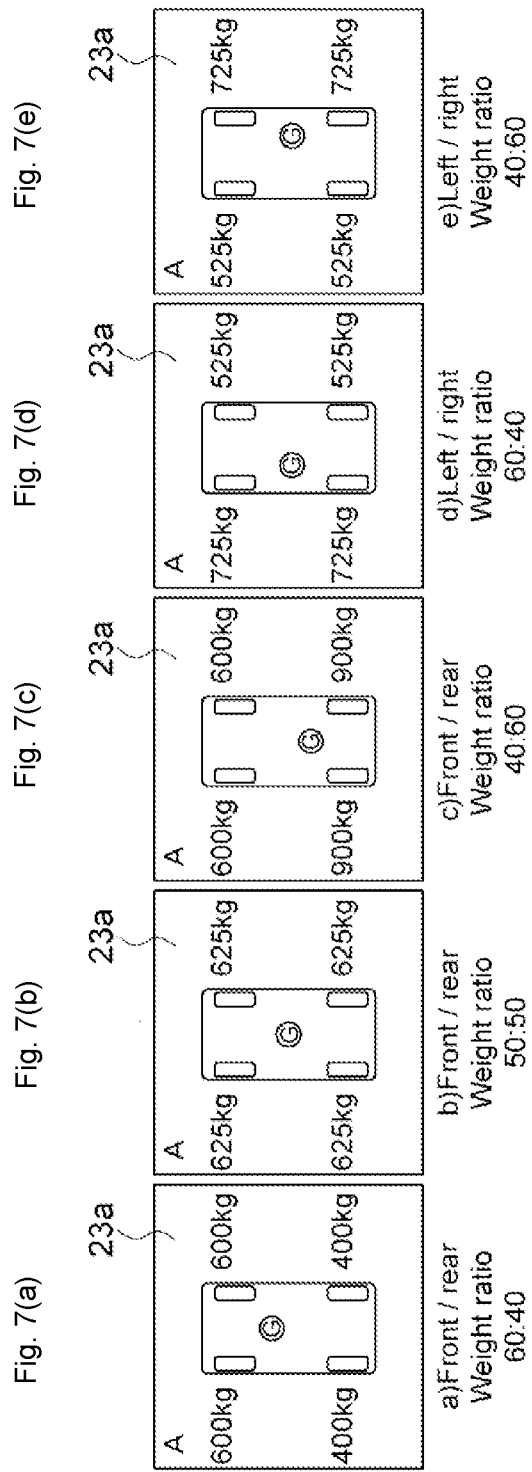

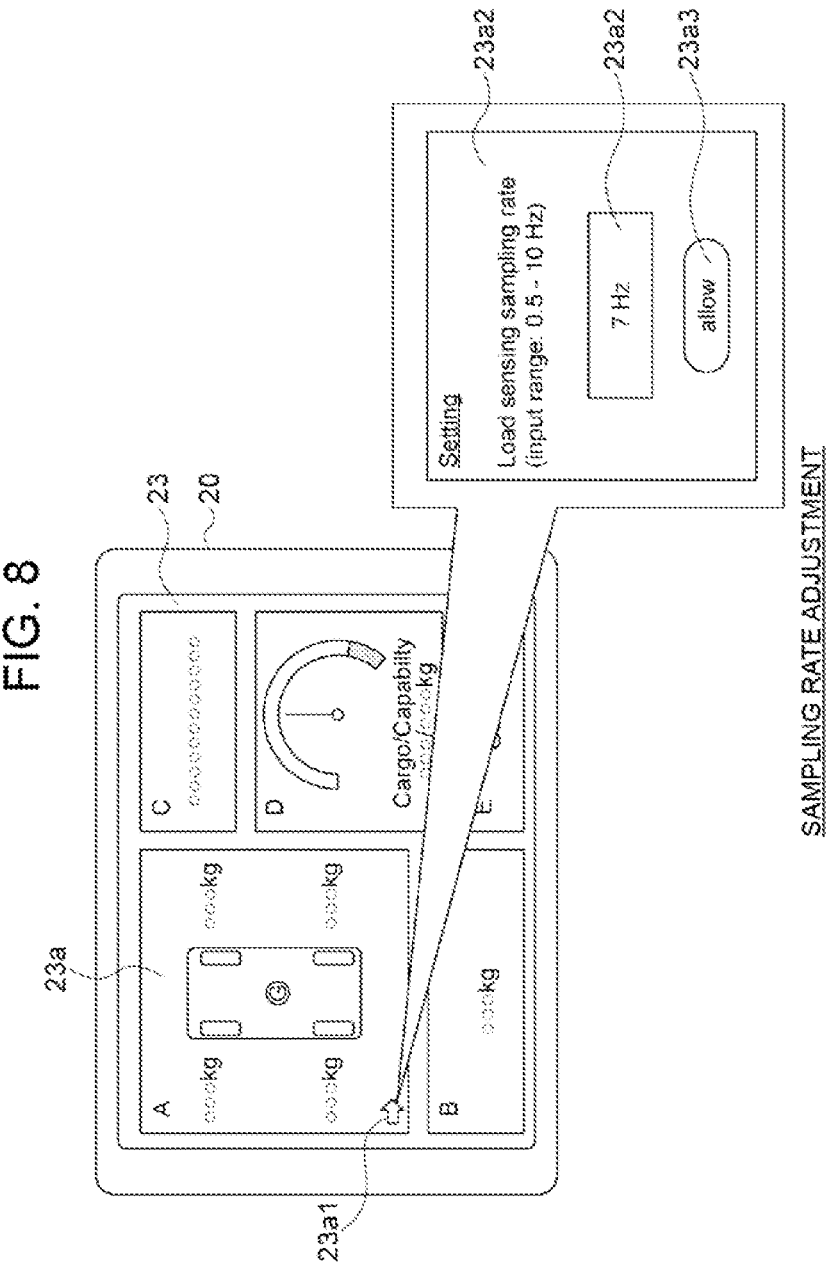

IN-VEHICLE TRANSMISSION DEVICE AND MOBILE TERMINAL, AND LOADAGE INFORMATION DISPLAY SYSTEM INCLUDING SAME

CROSS REFERENCE TO RELATED APPLICATIONS

This application is a U.S. National Phase Application under 35 U.S.C. 371 of International Application No. PCT/JP2019/043732, filed on Nov. 7, 2019, which claims priority to Japanese Patent Application No. 2018-214035, filed on Nov. 14, 2018. The entire disclosures of the above applications are expressly incorporated by reference herein.

BACKGROUND

Technical Field

The present invention is an in-vehicle signal-sending device, a mobile terminal and a load (loadage) information display system including the in-vehicle signal-sending device and the mobile terminal for measuring a sum of weights (referred to as "load (kgf)"), i.e., loadage, applied to a right wheel, a left wheel, a front wheel and a rear wheel respectively of a vehicle, in particular, a small commercial vehicle, and displaying the loadage to a driver to inform the driver of the loadage.

Related Art

One of conventional technologies is, for example, as disclosed in Japanese Patent Application Laid-Open Publication No. Hei.11-248525, a vehicle composite display device that uses a microcomputer, which presets a table of offset adjustment values, a table of characteristic correction values, and a table of gain values together with weight conversion formula and the like, for processing a load output signal from a strain gauge and a magnetostrictive sensor or the like mounted in the vicinity of each wheel of a vehicle, and for displaying the result of the processed load output signal on a load weight display device.

However, the loadage display device of Japanese Patent Application Laid-Open Publication No. Hei.11-248525 suffers from the following drawbacks, i.e., an in-vehicle ECU (Electronic Control Unit) and a power supply are required to control the loadage display device, a microcomputer for correction calculation is required to utilize a loadage sensor output offset adjustment value, a characteristic correction value gain value and the like, and a display screen in the vehicle is only used to confirm information about the vehicle weight, the loadage and the loading deviation (i.e., it is not possible to confirm such information from a remote location).

It is necessary to inform the driver with alarms such as warning lights and alarms that inform the driver of overloading when the specified maximum loading capacity is exceeded. By preventing the overloading, it is possible to reduce the risk of occurrence of serious accidents due to insufficient braking distance or rolling during turning on a curved road or the like, and also decrease a force exerted on a road surface so as to reduce a damage onto the road surface.

The alarm is not triggered if the loadage does not exceed the maximum loading capacity, but there is a possibility that the above-mentioned running instability may occur and the road surface may be damaged when the loadage on the vehicle is close to the specified maximum loading capacity.

Thus, the problem to be solved by the present invention is to provide a loadage information display system that not only alarms the overloading but also sends the loadage information from an in-vehicle signal-sending device to a mobile terminal via a wireless communication channel to display the loadage information in real time on a screen of the mobile terminal, thereby preventing a traffic accident that would otherwise have an increased probability of occurrence due to the overloading and improving the safety performance, and utilizing the load weights on the four wheels for the control of a brake and a transmission of the vehicle.

SUMMARY

To achieve such an object, an in-vehicle signal-sending device according to a first aspect of the present invention is directed to an in-vehicle signal-sending device that includes a sensor signal collecting unit for collecting a sensor signal that represents a vehicle loadage, an in-vehicle communication unit for communicating with a mobile terminal, and an in-vehicle control unit,
  the sensor signal collecting unit has a function of collecting the sensor signal of a loadage sensor provided in the vicinity of each wheel of the vehicle, and
  the in-vehicle control unit has a function of sending the sensor signal to the mobile terminal via the in-vehicle communication unit in response to a request from the mobile terminal.

Communications between the in-vehicle communication unit and the mobile terminal may be short-range communications.

A mobile terminal according to a second aspect of the present invention is directed to a mobile terminal that includes a mobile communication unit for communicating with an in-vehicle signal-sending device, an input operation unit for performing data input, an arithmetic processing unit for performing calculation processing, a display unit for displaying on a screen thereof, a storage unit for storing screen display information (information necessary to display desired items on the screen), and a mobile control unit for controlling the display unit,
  the arithmetic processing unit has a function of calculating loading deviation based on vehicle specifications (by presetting from the input operation unit) and vehicle loadage information represented by a sensor signal from the mobile communication unit,
  the storage unit has a function of presetting the vehicle specifications, the loading deviation, and screen display information to be used to display the vehicle specifications and the loading deviation on the screen of the display unit, and
  the mobile control unit has a function of causing the display unit to display at least the vehicle specifications and the loadage information based on the screen display information.

Communications between the in-vehicle communication unit and the mobile terminal may be short-range communications.

The display unit of the mobile terminal may display a loading status of the vehicle loadage information in an analog format with a pointer-type instrument image and may display loadage in a digital format with a numerical value such that the loading status in the analog format and the loadage in the digital format may be simultaneously displayed in the same screen.

A sampling rate of the sensor signal of the mobile terminal may be between 0.5 Hz and 10 Hz.

The storage unit of the mobile terminal may store a record of a loading status during traveling of a vehicle.

A loadage information display system according to a third aspect of the present invention is directed to a loadage information display system that includes the above-described in-vehicle signal-sending device and the above-described mobile terminal.

Advantages of the Invention

According to the present invention, it is possible not only to alarm the overloading, but also send the loadage information from the in-vehicle signal-sending device to the mobile terminal via the wireless communication channel to display the loadage information in real time on the mobile terminal screen, whereby it is possible to prevent a traffic accident that has an increased probability of occurrence due to the overloading, improve the safety performance and utilize the load information of the four wheels for the purpose of controlling the brake and the transmission of the vehicle.

BRIEF DESCRIPTION OF THE DRAWINGS

FIG. 2 shows an exemplary loadage sensor on a vehicle according to the embodiment of the present invention.

FIG. 4 illustrates a sub-screen that displays a loading deviation, which is a part of the display screen of the mobile terminal according to the embodiment of the present invention.

FIGS. 5 (a), 5 (b) and 5 (c) are views to show the screen transitions corresponding to the loadage displayed on the display unit of the mobile terminal according to the embodiment of the present invention.

FIGS. 6(a) and 6(b) and 6(c) are views useful to describe the sub-screens, which are part of the display screen shown in FIGS. 5(a), 5(b) and 5(c), respectively.

FIGS. 7(a), 7(b), 7(c), 7(d) and 7(e) are views useful to describe the loading deviation sub-screens, which are part of the display screen of the mobile terminal according to the embodiment of the present invention.

FIG. 8 is a view useful to describe the sampling rate adjustment, which is a part of the display screen of the mobile terminal according to the embodiment of the present invention.

DETAILED DESCRIPTION

Figure 1:
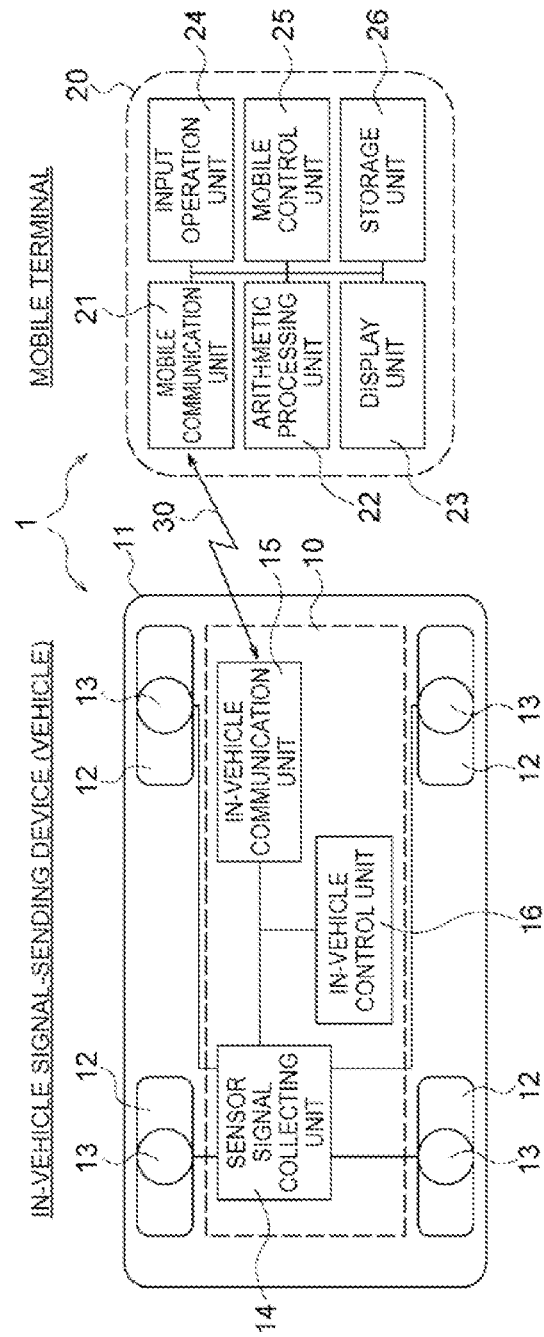
FIG. 1 is a block diagram that illustrates an in-vehicle signal-sending device and a mobile terminal according to an embodiment of the present invention and a loadage information display system including the in-vehicle signal-sending device and the mobile terminal according to the embodiment of the present invention.

Hereinafter, an embodiment of the present invention will be described with reference to the drawings. FIG. 1 is a block diagram showing a configuration of a vehicle-mounted signal-sending device, a mobile terminal (device) and a loadage information display system including the vehicle-mounted signal-sending device and the mobile terminal according to the embodiment of the present invention.

As shown in FIG. 1, the loadage information display system 1 of this embodiment includes an in-vehicle signal-sending device 10 mounted on the vehicle 11, and a mobile terminal 20 which a driver of the vehicle can carry. The mobile terminal here specifically is directed to a mobile terminal, such as a smartphone or a tablet computer, that has a short-distance wireless communication (signal-sending) channel 30 which utilizes a Bluetooth (registered trademark, hereinafter not mentioned) technique or the like.

It should be noted that the present invention is not limited to this embodiment and can be appropriately changed and modified in design within the scope of the present invention.

In-Vehicle Signal-Sending Device

The in-vehicle signal-sending device 10 includes a sensor signal collection unit 14, an in-vehicle control unit 16, an in-vehicle communication unit 15 for communicating with the mobile terminal 20, and a power supply unit (not shown). In order to establish a desired communication environment for the wireless communication channel 30 to communicate with the mobile terminal 20, it is preferred that the mounting location of the in-vehicle signal-sending device 10 inside the vehicle 11 is in a rear area inside the vehicle close to a sliding door or a hatchback door, through which the vehicle driver who carries the mobile terminal 20 performs the loading and unloading of baggage, luggage, goods and/or other things into and out of the vehicle. The in-vehicle control unit 16 includes a CPU (central processing unit) and a memory (or memories).

Incidentally, the power supply unit (not shown) is a battery mounted on the vehicle, and supplies power to each unit of the in-vehicle signal-sending device 10 such that each unit operates properly.

The sensor signal collecting unit 14 is connected to pressure sensors 13a, 13a, 13a and 13a (FIG. 2) of the four loadage sensors 13, 13, 13 and 13 disposed on, for example, suspension units of the front, rear, left and right wheels 12 of the vehicle 11 such as a small commercial vehicle, and has a function of collecting sensor signals that represent the vehicle weight and the loadage (loads on the vehicle).

An example of the pressure sensor 13a will be described. For example, a portion of the loadage sensor 13 disposed on or near the front wheel is shown in FIG. 2, and the pressure sensor 13a is formed in a cylindrical shape and connected to a sensor connector (coupler) 13d provided on a lower surface 13c of a mounting portion 13b. Further, the mounting portion 13b has a plurality of bolt insertion holes 13e for inserting bolts to attach and fix the loadage sensor to a suspension assembly.

The loadage sensor 13 of this embodiment is a hydraulic type. As shown in FIG. 2, when the loadage sensor receives a spring load P, a diaphragm provided in the loadage sensor 13 flexibly deforms, the pressure of a hydraulic chamber rises, and the loadage can be measured from this pressure change. After measuring the pressure, the pressure is converted into a sensor signal of voltage (electricity), and the resulting sensor signal is collected by the sensor signal collection unit 14 via wiring 13f.

It should be noted that the pressure sensor 13a of the loadage sensor 13 which is assumed in the embodiment of the present invention is one of well-known sensors appropriately selected and used within the scope of the present invention, particularly limited interpretation should not be applied in this regard, and an optimal sensor may be appropriately selected within the scope of the present invention.

It should be noted that the sensor signal collection function of the sensor signal collection unit 14 may be started by a request from the mobile terminal 20 before the engine start of the vehicle 11 or the sensor signal collection function of the sensor signal collection unit 14 may be started as the in-vehicle signal-sending device 10 is turned on in conjunction with the engine start of the vehicle 11 caused by a driver. Further, assuming that the loading operation to the vehicle 11 may start before the engine start, each unit function of the in-vehicle signal-sending device 10 (including the sensor signal collection function of the sensor signal collecting unit 14) may be automatically turned on as the loadage sensor 13 detects the loading even if the engine is not started. In this embodiment, the sampling rate of the sensor signal is adjusted to 7 Hz, for example.

The in-vehicle control unit 16 controls the function and operation of each unit of the in-vehicle signal-sending device 10, e.g., the in-vehicle control unit controls the sensor signal collection of the sensor signal collection unit 14 and the communication of the in-vehicle communication unit 15.

In addition to controlling the operation of each unit, the function of the in-vehicle control unit 16 includes to store the control information for each unit and the sensor signal of the voltage (electricity) of the sensor signal collecting unit 14 in a memory connected to the CPU and transfer the control information and the sensor signal to the in-vehicle communication unit 15. To store the sensor information, a hard disk, a semiconductor memory or the like may be used.

The in-vehicle communication unit 15 is an interface unit or module for performing wireless communication 30 with the mobile terminal 20 and receives the collection result of the sensor signal(s) from the sensor signal collection unit 14.

In this embodiment, although the Bluetooth is used for the wireless communication of the in-vehicle communication unit 15, the wireless communication channel is not particularly limited to the Bluetooth, i.e., it is possible to use other known communication channels or techniques.

If the Bluetooth is used, first, the power of the mobile terminal 20 is turned on while the in-vehicle communication unit 15 is in a pairing mode and in a standby state for short distance pairing. As an application software according to this embodiment (hereinafter, simply referred to as the application software) is started by the driver, the in-vehicle communication unit automatically performs the pairing process in response to a pairing request from the mobile terminal 20, thereby establishing the connection of the wireless communication 30 to each other.

Bluetooth is one of the short-range wireless communication standards for digital devices. By using the existing functions of the mobile terminal 20, it is possible to realize the operation of this embodiment without adding a new circuit or the like to the mobile terminal.

It should be noted that the present invention is not limited to the above-described Bluetooth technique and any mobile communication method may be used, such as WiFi short-range communication (NFCs), cellular networks, or any other wireless or RF-connection method.

As described above, the in-vehicle signal-sending device 10 of this embodiment can send the sensor signal (detection signal) of the loadage sensor 13 of each wheel 12 to the mobile terminal 20 such as a smartphone or a tablet computer via a short-range communication network such as Bluetooth, thereby eliminating the need for an in-vehicle ECU required in the prior art arrangement and eliminating the need for a wire system.

Mobile Terminal

The mobile terminal 20 includes a mobile communication unit 21 that communicates with the in-vehicle communication unit 15 of the in-vehicle signal-sending device 10, and an arithmetic processing unit 22 that calculates the loading deviation based on the loadage information obtained by summing the weight of the vehicle and the load of each wheel represented by the sensor signals received from the mobile communication unit 21. The mobile terminal also includes a display unit 23 that displays the information of the weight of the vehicle, the loadage, and the loading deviation obtained by the arithmetic processing unit 22 on a screen, and a mobile control unit 25 that performs the screen control of the display unit 23. The mobile terminal also includes an input operation unit 24 that receives the operation of entering the numerical values of the vehicle specifications to the arithmetic processing unit 22, the operation of adjusting the sampling rate, the operation of deciding the screen display layout and the like, and a storage unit 26 that stores a plurality of screen display layouts, the numerical values of the vehicle specifications, the log (record) of the loading situation (electronic tachographs that are recorded over time), and the like.

It should be noted that although not shown, the mobile terminal 20 also has a function of sounding the alarm regarding the loadage information. In order not to surprise the driver with the warning sound, however, the mobile terminal is set so as not to sound the alarm by turning off a speaker of the alarm in the initial setting of the application software.

Specifically, the mobile terminal 20 is a mobile device such as a smartphone or a tablet computer, and the application software is installed (implemented) in the mobile terminal 20. Thus, by updating the application software from time to time, it is possible to easily update the vehicle information and the program calculation formula.

The mobile communication unit 21 faces the in-vehicle communication unit 15 to perform wireless communication with the in-vehicle communication unit 15, i.e., the mobile communication unit performs wireless communication using the communication technique such as the Bluetooth technique provided in the mobile terminal 20. The description of the communication technique is omitted because it overlaps the description in connection with the in-vehicle communication unit 15 described above. The communication technique is not limited to a particular technique, and it is possible to use a known communication technique.

The calculation formula or arithmetic formula has been installed (implemented) into the mobile terminal 20, and the calculation processing unit 22 can calculate the loading deviation from the loadage of the front wheel, the rear wheel, the right wheel and the left wheel 12 which are measured by the respective sensors. Specifically, the calculation processing unit 22 can calculate the weight distribution, the center of gravity of the vehicle in an empty condition, and the center of gravity of the vehicle in a loaded condition. The calculation (operation) of the arithmetic processing unit 22 will be described below.

Figure 3A:
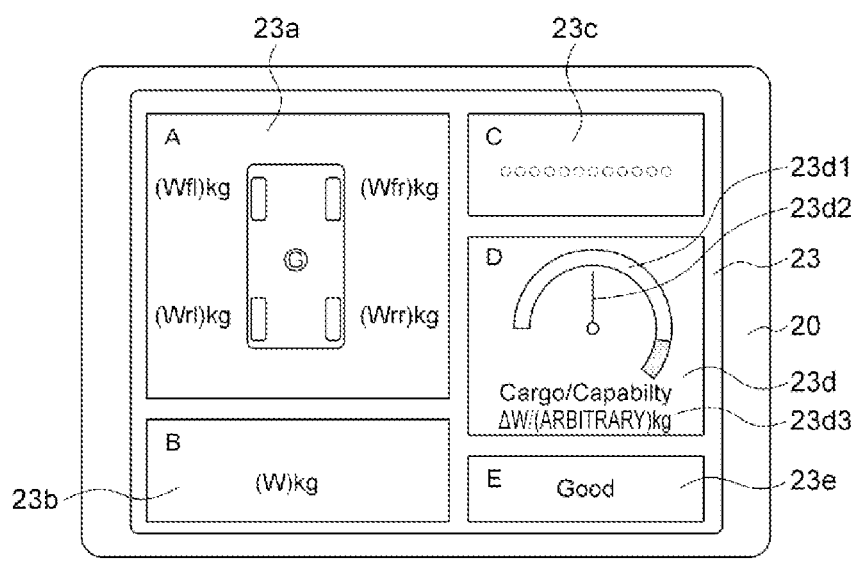
FIG. 3(a) shows an exemplary display screen of the mobile terminal according to the embodiment of the present invention.
Figure 3B:
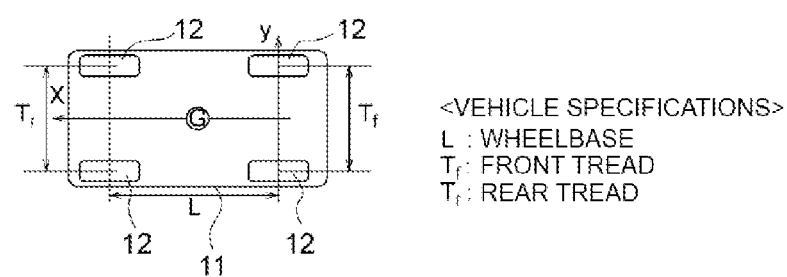
FIG. 3(b) is a view useful to describe the vehicle specifications required to calculate the loading deviation of the vehicle.

FIG. 3 (*b*) shows the vehicle specifications required for the above-mentioned calculation. Numerical values of the vehicle specifications associated with the type of the vehicle are recorded in the storage unit 26 by an input operation (data entry operation) in the initial setting. Thus, as the driver selects the vehicle type or the like, which is entered from the input operation unit 24 at the time of starting the application software, the vehicle specifications are automatically read (retrieved) that correspond to the selected vehicle type such that the vehicle specifications are utilized for the calculation of the center of gravity of the vehicle in the empty condition and the center of gravity of the vehicle in the loaded condition. It should be noted that each time the driver starts the application software, the driver may directly input (enter) the numerical data of the vehicle specifications by using the input operation unit 24 such that the numerical data will be used for the calculation.

In the vehicle specifications described below, as shown in FIG. 3 (b), the wheelbase represents the distance between the front axle 12 and the rear axle 12, the front tread represents the distance between the center of the left wheel 12 and the center of the right wheel 12 of the vehicle 11 (wheel distance), and the rear tread represents the distance between the center of the left wheel 12 and the center of the right wheel 12 of the vehicle 11. The units of the wheelbase, the front tread and the rear tread are millimeters. Vehicle specifications required for conversion (calculation) in the calculation formula L represents the wheelbase.
$T_f$ represents the front tread.
$T_r$ represents the rear tread.

The sum of the individual weights measured by the loadage sensors 13, 13, 13 and 13 of the four wheels 12, 12, 12 and 12 (i.e., the front, rear, left and right wheels) is the vehicle loadage W (kg) as shown in Equation (1). As shown in FIG. 3, the driver can visually recognize the loadage of each of the front, rear, left and right wheels 12 on the display screen 23a.

Formula 1

$$\text{Vehicle Loadage } W \text{ (kg)} = W\_fl + W\_fr + W\_rl + W\_rr \qquad (1)$$

W_fl: Loadage of the front left wheel (kg)
W_fr: Loadage of the front right wheel (kg)
W_rl: Loadage of the rear left wheel (kg)
W_rr: Loadage of the rear right wheel (kg)

As shown in the display screen 23d of FIG. 3 (a), Equation (1) is used and the difference between the empty vehicle weight Wo and the loaded vehicle weight Wn, which is represented by the loadage ΔW, is shown in the numerator while the maximum loading capacity is shown in the denominator. Thus, the loading state is concretely recognized in the numerical value. Incidentally, the maximum loading capacity can be set for each vehicle.

The definition of each mass (weight) sum is as shown in Equation (2). In Equation (2), the sum of the loads on the front wheels 12 is indicated by Wfront (kg), the sum of the loads on the rear wheels is indicated by Wrear (kg), the sum of the loads on the left wheels is indicated by Wleft (kg), and the sum of the loads on the right wheels is indicated by Wright (kg).

$W_{front}$: Total loadage on the front wheels (kg)
$W_{rear}$: Total loadage on the rear wheels (kg)
$W_{left}$: Total loadage on the left wheels (kg)
$W_{right}$: Total loadage on the right wheels (kg)

Formula 2

$$W_{front} = W_{fl} + W_{fr}$$

$$W_{rear} = W_{rl} + W_{rr}$$

$$W_{left} = W_{fl} + W_{rl}$$

$$W_{right} = W_{fr} + W_{rr} \qquad (2)$$

The formula for calculating the weight distribution of the front and rear wheels of the vehicle and the weight distribution of the left and right wheels of the vehicle are shown in Equation (3).

The vehicle weight W (kg) is the denominator, and the front-rear weight distribution (%) on the front and rear wheels and the left-right weight distribution (%) on the left and right wheels are shown, respectively.

Formula 3

$$\text{Vehicle loadage } W \text{ (kg)} = W_{fl} + W_{fr} + W_{rl} + W_{rr}$$

$$\text{Front rear weight distribution}(\%) = W_{front}/W \times 100$$

$$\text{Left-right weight distribution}(\%) = W_{left}/W \times 100 \qquad (3)$$

The formula for calculating the position of the center of gravity in the empty condition, i.e., when the vehicle is not loaded, is shown in Equations (4) and (5). Here, x and y denote the coordinates of the pointer G on a sub-screen (subsidiary screen, window screen) A in FIG. 3(a).

Formula 4

$$x_0 = \frac{w_{rear}}{W} L \qquad (4)$$

Formula 5

$$y_0 = \frac{0.5\left\{T_f - \frac{x_0}{L}(T_f - T_r)\right\}(w_{left} - w_{right})}{W} \qquad (5)$$

The formula for calculating the position of the center of gravity in the loaded condition, i.e., when the vehicle is loaded, are shown in Equations (6) and (7). Here, x and y denote the coordinates of the pointer G on the sub-screen A in FIG. 3(a).

Formula 6

$$x_1 = \frac{\sum_{n=1}^{n} M_n x_n + L w_{rear}}{\sum_{n=1}^{n} M_n + W} \qquad (6)$$

Formula 7

$$y_1 = \frac{0.5\left\{T_f - \frac{x_0}{L}(T_f - T_r)\right\}(w_{left} - w_{right}) + \sum_{n=1}^{n} M_n y_n}{\sum_{n=1}^{n} M_n + W} \qquad (7)$$

Calculation of the above-mentioned formula is carried out at high speed as the vehicle weight and the loadage are entered into the arithmetic processing unit 22 at predetermined intervals upon adjustment of the sampling rate of the sensor signal to the high-speed (e.g., 7 Hz). Thus, it is not necessary to perform the correction process to the load sensor output offset adjustment value, the characteristic correction value, the gain value and other values, which are required in the prior art.

Since the calculation is carried out at high speed, the display screen is continuously updated in real time at all times, and the driver can immediately grasp the loading deviation from the loadage on each of the front wheel, the rear wheel, the left wheel and the right wheel.

Conventionally, the load output signals from the strain gauge and the magnetostrictive sensor or the like mounted on the vehicle in the vicinity of each wheel are processed (calculated) by a microcomputer, which utilizes the tables of the load sensor output offset adjustment values, the characteristic correction values, the gain values and the like together with weight conversion formula and the like preset in the vehicle. In the embodiment of the present invention, on the contrary, it is not necessary to dispose the microcomputer in (on) the vehicle because such complicated processing is not required.

It should be noted that although the operation (calculation, processing) in the arithmetic processing unit 22 may be carried out by a CPU provided in the mobile terminal 20, there may be an arithmetic processing unit provided for each arithmetic processing.

The mobile control unit 25 controls the display unit 23 by a CPU provided in the mobile terminal 20, and issues an instruction to simultaneously display the vehicle loadage and the loadage on each wheel received from the mobile communication unit 21 together with the loadage information such as the loading deviation calculated by the arithmetic calculation on a single display screen. For example, as shown in FIG. 3 (a), a plurality of sub-screens are shown in the single (same) displays screen 23, i.e., the sub-screen A (the loadage on each wheel and the center of gravity of each wheel (although not shown, the total weight on the respective wheels can also be displayed)) is displayed on the display screen 23a, the sub-screen B (the weight of the vehicle) is displayed on the display screen 23b, the sub-screen C (the text information such as the model type, the vehicle body number and the vehicle specifications) is displayed on the display screen 23c, the sub-screen D (the load weight relative to the maximum loading capacity) is displayed on the display screen 23d, and the sub-screen E (the loading status (indication of any of the three statuses of Good/Warning/Overload)) is displayed on the display screen 23e.

Thus, the mobile terminal 20 can simultaneously display the loadage information of the vehicle at the time of empty or loaded on the same screen of the display unit 23, and the driver can immediately recognize the loadage information without moving the line of sight. Therefore, this embodiment can be said to be a user-friendly interface for the driver.

As described above, a predetermined display screen (area, layout) is read from the storage unit 26 upon receiving a display instruction from the mobile control unit 25, and the control is performed so as to display a plurality of pieces of loadage information A to E on the display screens 23a to 23e, respectively, in accordance with the display instruction.

It should be noted that when the screen size of the mobile terminal 20 is small as that of the smartphone terminal, the mobile control unit 25 may perform screen shift control so as to display any one of the sub-screen A (the load of each wheel and the center of gravity position of the wheels), the sub-screen B (the vehicle loadage), the sub-screen C (the text information such as the model type, the vehicle body number and the vehicle specifications), the sub-screen D (the loadage relative to the maximum loading capacity), and the sub-screen E (the loading status (three stages of Good/Warning/Overload)).

In addition, the selective displaying of the four screens based on the above-mentioned screen shift control may be carried out such that a display screen that is preferential to the driver is selected and therefore the displayed (selected) screen will be a desired screen by means of the screen shift control.

The display unit 23 is configured to display the information, such as the vehicle weight and the loadage received in the form of the sensor signals and the loading deviation obtained by the calculation in the calculation processing unit 22, in the respective (individual) screen areas of the display screen. The display unit 23 may use a known display unit such as a liquid crystal display provided in a mobile terminal device such as a smartphone or a tablet computer. The description of this embodiment assumes a tablet computer having a large size of display screen.

The input operation screen of the input operation unit 24 is displayed on the display unit 23 by using the touch panel function of the display screen of the display unit 23. This function will be described when the input operation unit 24 will be described.

Also, regardless of whether the user of the mobile terminal is inside the vehicle or outside the vehicle, the user can visually recognize the vehicle loadage information on the display unit 23 of the mobile terminal 20 from the outside of the vehicle 11. Considering the safety during the traveling of the vehicle, it is desirable to connect the mobile terminal 20 to a display screen of an in-vehicle navigation device wirelessly or by wiring while traveling, such that the vehicle loadage information is displayed on the display screen of the in-vehicle navigation device. That is, if the display screen of the in-vehicle navigation device can be used, not only the driver but also passengers in the passenger seat can visually recognize the loading deviation or the like, so that the safety is more enhanced.

Roles of the Display Screens

First, the roles of the display screens 23a to 23e of the display unit 23 will be described. In this embodiment, the display screens 23a and 23b are arranged and displayed in the left area of the single large screen, and the display screens 23c to 23e are arranged and displayed in the right area of the same screen. However, the present invention is not limited to this screen layout, and it is within the scope of the present invention even if the combination or arrangement of the above-mentioned layout is changed. Further, the display screens 23a, 23d and 23e are used to show the warning indications when overloading, dangerous eccentric load, collapse of the load, or the movement of the load occurs. In particular, the display screen 23a and 23d are larger than the other display area so that the displayed contents can be emphasized to the driver.

The display screen 23a, which is a substantially square area in the upper left region of the display unit 23, shows the sub-screen A to display the load on each wheel and the center of gravity position of the wheels (it is also possible to show the total weight of the respective wheels). Specifically, the four wheels (i.e., the front wheel, the rear wheel, the left wheel and the right wheel) of the vehicle are shown in the display screen 23a, and the loads on the four wheels 12, 12, 12 and 12 measured by the loadage sensors 13, 13, 13 and 13 for the respective wheels are indicated (shown) by the numbers ((Wfl)kg, (Wfr)kg, (Wrl)kg, and (Wrr)kg) in the drawing). The upper left substantially square area A partitioned by the display screen 23a is larger than the other information display areas B, C, D and E such that the area A is easily recognized by the driver.

Thus, not only the mere display of the numbers is presented, but also the numbers are integrally displayed with the illustration of the vehicle 11 and the wheels 12, so that the driver can easily and intuitively recognize the displayed contents, which is user-friendly to the driver.

Further, the indication (mark) of the center of gravity position G is schematically shown in the illustration of the vehicle on the display screen 23a to show the information of the loading deviation obtained by the calculation carried out in the arithmetic processing unit 22. FIG. 5 is a set of views to show examples of the loading deviation. The symbol "G" represents a pointer, and the change in loading deviation is graphically displayed by the pointer "G" moving in the x-direction and the y-direction (on the x-y plane) in accordance with the loadage of each wheel. The symbol "G" comes from the letter "G" of "Center of Gravity".

In FIG. 4, which shows a partially enlarged view of the display 23a, when the loadage is ideally balanced, the pointer "G" is present at the center of the vehicle 11. The pointer "G" moves to a position corresponding to the loadage in the screen upon receiving an instruction of the mobile control unit 25 based on the calculation result of the loading deviation (see Equations (6) and (7). x and y are the coordinates of the pointer G) in which the loading deviation is calculated from the loadage of each wheel 12 as the loads are placed on the vehicle 11.

The movement result of the pointer "G" in the display screen 23a is classified into three stages based on the position determined according to the loading deviation (position after movement). The three-stage classification includes the "deviation (small), Good (thin shaded area in FIG. 4)" when the movement result is close to the original center of gravity of the vehicle (center of the vehicle), the "deviation (medium), Warning (slightly darker shaded area in FIG. 4)" when the movement result is slightly deviated from the original center of gravity of the vehicle (center of the vehicle), and the "deviation (large), Danger (darkest shaded area in FIG. 4)" when the movement result is further deviated. In other words, the loading status (Good/Warning/Overload) is classified into the three stages. The driver can instantaneously understand which location of the loading has a problem as the position indicated by the pointer "G" moves up, down, left, and right (the arrow in FIG. 4) on the x-y plane according to the loadage.

By displaying in this way, the loading status is made intuitively easy to recognize and user friendly to the driver.

The display screen 23b, which is a substantially square area in the lower left region of the display unit 23, shows the B screen to display the vehicle loadage. Thus, the total loadage information of the vehicle can be obtained and confirmed at the same time.

The display screen 23c in the upper right area of the display screen of the display unit 23 shows the sub-screen C to display the text information such as the model type, the vehicle body number and the vehicle specifications. Thus, the general information of the vehicle can be obtained and confirmed at the same time.

The display screen 23d in the right middle area of the display screen of the display unit 23 shows the sub-screen D to display the loadage to the maximum loading capacity. Specifically, in addition to confirming the loading deviation by means of the movement of the pointer "G", the display screen 23d shows the loading status of the vehicle loadage information in an analog format using a pointer-type instrument image whereas the indication of the loadage is displayed in a digital format by numerical values and presented to the driver simultaneously on the same screen.

Specifically, the loading status is displayed by means of the indicator image 23d1, 23d2 of the pointer type on the screen, and an image of the loadage is displayed by the digital loadage display meter 23d3 in the form of the number image. Thus, the loadage is simultaneously displayed in the upper and lower areas of the same display screen 23d in the form of the analog image display and the digital format (numbers). Accordingly, in the display screen 23d, the indication of the pointer 23d2 is given in association with the instrument image 23d1 to show the three stages of the loading status and is simultaneously displayed together with the digital loadage display meter 23d3 in a mixed manner.

This makes it possible for the driver to accurately check the loading conditions because the digital indication (numbers) is combined with the analog image indication (image) of the pointer type instrument on the same display screen to increase the reading accuracy and make it easier to understand. In other words, it realizes a user-friendly man-machine interface for the driver.

Further, it is possible for the driver to visually and accurately grasp the loading deviation and the loadage change due to, for example, an incident such as falling of the load while the vehicle is traveling.

Because the loading status of the vehicle 11 is displayed in different ways in the above-described manner, it is possible for the driver to intuitively grasp the loading status from the pointer position, and accurately confirm the loading status from the digital loadage display meter.

In the display screen 23e, which is presented in the lower right area of the screen of the display unit 23, the sub-screen E shows the loading status (three stages of Good/Warning/Overload) such that the respective characters of Good/Warning/Overload are displayed in black, together with the background color corresponding to the loading status (the display area of the display screen 23e is colored with green (or blue) if "Good" is shown, with yellow if "Warning" is shown and with red if "Overload" is shown although the drawing is colorless).

Specifically, for example, the loading status "Good" shown on the display screen 23e of FIG. 5 (a) is the range where the pointer 23d2 of the analog meter is in the green zone (colorless in the drawing), the loading status "Warning" shown on the display screen 23e of FIG. 5 (b) is the range where the pointer 23d2 of the analog meter is in the yellow zone (colorless in the drawing), and the loading status "Overload" shown on the display screen 23e of FIG. 5 (c) is the range where the analog meter pointer is in the red zone (shaded in the drawing). Further, in the display screen 23d, the loadage (numerator) for the total loadage capacity (denominator) is digitally displayed in the area 23d3 (FIG. 3 (a)) below the instrument image of the loading status.

Thus, together with displaying the pointer 23d2 of the analog meter indicating the state of loading (analog display), the loadage (numerator) to the loading capacity (denominator) is displayed in the digital format in the area 23d3 below the pointer 23d2. That is, a combination of two types of image (two different types of indication, i.e., analog indication and digital indication) is displayed in the same screen area integrally, and therefore the driver can contrastively interpret the state of the load.

In particular, because the loading deviation is displayed in full color (e.g., three colors of green, yellow and red) and graphically, the driver can easily determine whether or not there is a problem in the loading and grasp the current loading status of the vehicle.

When the loading status reaches the "Overload" range, the "Overload" indication can be flashed to alert the driver visually instead of the warning sound. For example, the driver and other persons may be alerted with no sound in the range of the loading status "Good", with long continuous tones in the range of the loading status "Warning", and with short continuous tones (tones repeated at short intervals) in the range of the loading status "Overload". If the warning sound is on, the volume can be increased gradually.

As the displaying is carried out in the above-mentioned different manners, it is possible to realize a user-friendly man-machine interface that gives the warning to the driver in an easy-to-understand manner for the driver.

Screen Display According to the Loadage

Next, examples of the display screens 23a to 23e in accordance with the status shift of the loadage will be described in detail using FIG. 5 and FIG. 6. In the following examples, we assume that a maximum loading capacity of the vehicle is 800 kg and a vehicle weight is 2000 kgf. A vehicle with a loadage of 200 kgf is shown in FIG. 5(a) and FIG. 6(a), a vehicle with a loadage of 600 kgf is shown in FIG. 5(b) and FIG. 6(b), and a vehicle with a loadage of 1000 kgf is shown in FIG. 5(c) and FIG. 6(c). Incidentally, for the sake of description, the pointer G remains at the same position in the drawings since the pointer G indicative of the center of gravity position is not described.

If the vehicle is loaded with a load of 200 kgf (hereinafter, this vehicle is referred to as a "200 kgf loading vehicle"), as illustrated in FIG. 5 (a), the display screen 23a shows that the loads of the four wheels 12,12,12 and 12 measured by the loadage sensors 13,13,13 and 13 of the vehicle are 50 kg (Wfl), 50 kg (Wfr), 50 kg (Wrl) and 50 kg (Wrr), respectively. As shown in FIG. 6(a), the display screen 23d shows, as a result of the calculation based on Equation (1), that the loadage of 200 kg, which is the sum of the respective wheel loads (Wfl)kg, (Wfr)kg, (Wrl)kg, and (Wrr)kg, is indicated in the numerator, and the maximum loading capacity of 800 kg is indicated in the denominator so that the loading condition can be visually recognized in concrete terms by the numerical values.

As shown in FIG. 6(a), the analog meter pointer 23d2 points to the green zone (colorless in the drawing). Therefore, as illustrated in FIG. 6 (a), the display screen 23e shows the loading status "Good" in the flashing (lit) manner, which is displayed in black on the green background color (colorless in the drawing). By this lighting display, the driver can recognize that the loading status is in the safe range.

In the case of the 200 kgf loading vehicle, as shown in FIG. 5(a), the display screen 23b also displays a total vehicle weight of 2200 kg, which is the sum of the vehicle loadage of 200 kg and the vehicle weight of 2000 kg.

When the vehicle is loaded with a load of 600 kgf (hereinafter, this vehicle is referred to as a "600 kgf loading vehicle"), as illustrated in FIG. 5 (b), the display screen 23a shows that the respective loads of the four wheels 12, 12, 12 and 12 measured by the vehicle loadage sensors 13, 13, 13 and 13 are 100 kg (Wfl), 100 kg (Wfr), 200 kg (Wrl) and 200 kg (Wrr). As shown in FIG. 6(b), the display screen 23d shows, as a result of the calculation based on Equation (1), that the loadage 600 kg, which is the sum of the vehicle loadage (Wfl)kg, (Wfr)kg, (Wrl)kg, and (Wrr)kg, is indicated in the numerator, and the maximum loading capacity of 800 kg is indicated in the denominator. Thus, the loading condition can be visually recognized in concrete terms by the numerical values.

As shown in FIG. 6(b), the analog meter pointer 23d2 points to the area of the yellow zone (colorless in the drawing). Therefore, the display screen 23e of FIG. 6(b) shows the loading status "Warning" in the flashing manner, which is in black on the yellow background color (colorless in the drawing). With this lighting indication, the driver can recognize that the loading condition is in a caution range beyond the safety range.

In the case of the 600 kgf loading vehicle, as shown in FIG. 5(b), a total weight of 2600 kg, which is the sum of the loadage of 600 kg and the vehicle weight of 2000 kg, is also displayed on the display screen 23b.

When the vehicle is loaded with a load of 1000 kgf (hereinafter this vehicle is referred to as a "1000 kgf loaded vehicle"), as shown in FIG. 5(c), the display screen 23a shows that the respective loads of the four wheels 12, 12, 12 and 12 measured by the loadage sensors 13, 13, 13 and 13 of the vehicle are 150 kg (Wfl), 150 kg (Wfr), 350 kg (Wrl), and 350 kg (Wrr). As shown in FIG. 6(c), the display screen 23d shows, as a result of the calculation based on Equation (1), that the loadage of 1000 kg, which is the sum of the vehicle loads (Wfl)kg, (Wfr)kg, (Wrl)kg, and (Wrr)kg, is indicated in the numerator and the maximum loading capacity of 800 kg is indicated in the denominator, so that the overload condition can be visually confirmed in concrete terms by the numerical values.

As shown in FIG. 6(c), the analog meter pointer 23d2 points to the area of the red zone (colorless in the drawing). Therefore, on the display screen 23e of FIG. 6(c), the loading status "Overload" is lit and displayed in black on the red background color (colorless in the drawing). This lighting display allows the driver to recognize that the loading condition is dangerous and in an overloaded condition.

In the case of the 1000 kgf loading vehicle, as shown in FIG. 5(c), the display screen 23b also displays a total weight of 3000 kg which is the sum of the loadage of 1000 kg and the vehicle weight of 2000 kg.

Therefore, the loading state of the loadage is displayed visually and appropriately by the display units 23a, 23d and 23e, and it is possible for the driver to easily grasp the loading state of the loads.

Screen Display According to the Movement of the Center of Gravity Position

Next, referring to FIG. 7(a), FIG. 7(b), FIG. 7(c), FIG. 7(d) and FIG. 7(e), how to display the pointer G in accordance with the movement of the center of gravity position will be described. The position of the pointer G moves up, down, left and right on the x-y plane according to the loadage, as shown in FIG. 4. Here, the top and bottom of the drawing are the front and rear of the vehicle, and the right and left of the drawing are the right and left of the vehicle.

In this embodiment, FIG. 7(a) shows the case where the center of gravity position (pointer G) is in a front area (part) of the vehicle 11 (upper side), FIG. 7(b) shows the case where the center of gravity position (pointer G) is in the center of the vehicle 11, FIG. 7(c) shows the case where the center of gravity position (pointer G) is in the rear area of the vehicle 11 (lower side), FIG. 7 (d) shows the case where the center of gravity position (pointer G) is in the left area of the vehicle 11, and FIG. 7 (e) shows the case where the center of gravity position (pointer G) is in the right area of the vehicle 11. Hereinafter, the five patterns shown in FIG. 7 (a) to FIG. 7 (e) will be described.

FIG. 7 (a) shows the pattern in which the center of gravity position (pointer G) is present in the front section (upper section) of the vehicle 11 in the display screen 23a. In the display screen 23a, when the loads of the four wheels 12, 12, 12 and 12 measured by the loadage sensors 13, 13, 13 and 13 of the vehicle are 600 kg (Wfl), 600 kg (Wfr), 400 kg (Wrl), and 400 kg (Wrr), respectively, and the front/rear weight ratio (front-to-rear weight ratio) is 60:40 (60 to 40), the pointer G indicating the position of the center of gravity is displayed in the front area of the schematic view of the vehicle shown in the screen display unit 23*a*.

As depicted in FIG. 7 (*b*), the display screen 23*a* shows that when the loads of the four wheels 12,12,12 and 12 measured by the loadage sensors 13,13,13 and 13 of the vehicle are 625 kg (Wfl), 625 kg (Wfr), 625 kg (Wrl) and 625 kg (Wrr), respectively, and the front/rear weight ratio (front-to-rear weight ratio) is 50:50 (50 to 50), the pointer G indicating the position of the center of gravity of the vehicle is displayed in the center of the schematic view of the vehicle illustrated in the screen display unit 23*a*.

As depicted in FIG. 7(*c*), the display screen 23*a* shows that when the loads of the four wheels 12, 12, 12 and 12 measured by the loadage sensors 13, 13, 13 and 13 of the vehicle are 600 kg (Wfl), 600 kg (Wfr), 900 kg (Wrl) and 900 kg (Wrr), respectively and the front/rear weight ratio (front-to-rear weight ratio) is 40:60, the pointer G indicating the position of the center of gravity is displayed in the rear area of the schematic view of the vehicle shown in the screen display 23*a*.

As depicted in FIG. 7(*d*), the display screen 23*a* shows that when the loads of the four wheels 12, 12, 12, and 12 measured by the loadage sensors 13, 13, 13 and 13 of the vehicle are 725 kg (Wfl), 525 kg (Wfr), 725 kg (Wrl), and 525 kg (Wrr), respectively, and the left/right weight ratio (left-to-right weight ratio) is 60:40, the pointer G indicating the position of the center of gravity is displayed in the left area of the schematic view of the vehicle shown in the screen display 23*a*.

As shown in FIG. 7(*e*), the display screen 23*a* shows that when the loads of the four wheels 12, 12, 12 and 12 measured by the loadage sensors 13, 13, 13 and 13 of the vehicle are 525 kg (Wfl), 725 kg (Wfr), 525 kg (Wrl) and 725 kg (Wrr), and the left/right weight ratio (left-right weight ratio) is 40:60, the pointers G indicating the position of the center of gravity is displayed in the right area of the schematic view of the vehicle shown in the screen display 23*a*.

In this manner, the position indicated by the pointer "G" is displayed on the screen, and therefore the driver easily, instantaneously and intuitively recognizes where there is a danger in the vehicle loading position. This is a user-friendly way of presenting the information.

Whether or not a dangerous loading deviation has occurred can be visually and accurately displayed on the display screen 23*a* by the displayed position of the pointer G relative to the range of the large deviation, the medium deviation or the small deviation as shown in FIG. 4. Thus, the driver can easily grasp the loading state of the load(s). In addition, when the center of gravity position is present in a dangerous position before traveling of the vehicle, the driver can correct the loading condition, which would otherwise cause the load collapse, before the start of traveling of the vehicle based on the displayed position of the pointer G.

If the change in the loading deviation occurs after the start of traveling of the vehicle, it is possible for the driver to visually and accurately grasp a fact such as a drop of the load or movement of the load, etc. Therefore, it is possible to prevent accidents during traveling of the vehicle and improve the safety.

As described above, this embodiment not only alarms the overload but measures the loadage by the sensors at the high speed rate and sends the measured values from the in-vehicle communication unit 15 to the arithmetic processing unit 22 via the wireless communication channel 30 and the mobile communication unit 21 for the processing of the measured values. Thus, it is possible to reliably prevent overloading by displaying the overall loadage information, including the loading deviation obtained by the arithmetic processing, in real time on the mobile terminal 20.

In addition, it is possible to prevent traffic accidents, of which probability of occurrence would otherwise increase due to overloading, and to improve safety performance. Also, it is possible to utilize the loadage information of the four-wheeled vehicle for the control of the transmission and brakes of the vehicle.

The input operation unit 24 includes a touch panel of the display screen of the display unit 23 of the mobile terminal 20 as an input display unit, and enables the initial setting entry by a user such as the entry of numerical values of the vehicle specifications, a sampling rate adjustment of the sensor signal, turning on/off of the warning sound, switching of the display screen, and a screen display layout, as well as displaying of data from the record of the loading status, shifting of the display screen and the like. The touch panel function may use known input technologies.

For example, an exemplary touch panel (Setting: Load sensing sampling rate) of the display screen of the display unit 23 is shown in FIG. 8. There is an arrow sign 23*a*1 displayed in the lower left area of the sub-screen A. Upon pressing the arrow sign 23*a*1 (Push), shown is a screen for determining the range of the sampling rate adjustment of the sensor signal. The adjustment range (input range) is from 0.5 Hz to 10 Hz. In this embodiment, 7 Hz is set as a predetermined numerical value (reference numeral 23*a*2). The sampling is performed at the sampling rate of 7 Hz upon pressing the "allow" display 23*a*3.

Upon receiving an instruction from the mobile control unit 25, the storage unit 26 of the mobile terminal 20 stores the numerical values of the vehicle specifications, and also stores the vehicle loadage W (kg) of the front, rear, left, and right wheels 12, the calculation result of the weight distribution (%) of the front, rear, left, and right wheels 12, the position of the center of gravity of the empty vehicle, the position of the center of gravity at the time of loading, all of which are the results of the re-calculation executed in real time from time to time and are presented as the record of the loading state during the traveling (electronic tachograph) or the like. The storage unit also stores the screen display information (information to display desired items on the screen) for displaying these results on the screen of the display unit 23, and the display information of the layouts of the display screens 23*a* to 23*c*.

That is, the storage unit 26 stores the fixed screen display information such as the display areas (arrangement layouts) of the display screens 23*a* to 23*d* of the display unit 23, the schematic image of the vehicle, the loading status, the pointer image and other images as a set of master images. The mobile control unit 25 combines the master images with the digital values of the loadage and the values indicated by the pointer on a graphic memory and makes a combined image such that the display unit 23 can display the combined image.

The information of the application necessary for shifting the input screen of the input operation unit 24 and displaying the screen is also stored in the storage unit 26.

In addition to the built-in hard disk of the mobile terminal 20, an external memory such as an SD card that can store data can be used as an external storage device for storing the above-mentioned information. These storage devices are used to perform an easy posteriori verification as the record of the loading condition during traveling (electronic tachograph) in the event of an accident related to the loading is recorded in the storage devices.

Processing Flow of the Loadage Information Display System

Next, a procedure of the main processing according to the embodiment of the present invention will be described.

Initial Setting

The driver operates the mobile terminal 20 to start the application and perform the initial setting. The initial setting is performed for necessary items such as entry (input) of the numerical values of the vehicle specifications (selection of a vehicle type), setting of a value (for example, 7 Hz) in a range from 0.5 Hz to 10 Hz as a sampling rate of the sensor signal, turning on or off of the warning sound (usually turned off), switching of a display screen (tablet computer, smartphone or other display devices), and selection of a screen display layout (all displays/partial display). After turning on of the mobile terminal, the initial setting is instructed to the related parts from the mobile control unit 25. After the entry of the initial setting, the entry operation of the initial setting with regard to the same type of vehicle is omitted because the initial setting for that type of the vehicle is recorded in the mobile terminal 20.

Step of establishing the wireless communication

When the driver operates the mobile terminal 20 to activate the displaying process of the loadage information, the mobile communication unit 21 of the mobile terminal 20 and the in-vehicle communication unit 15 are connected to each other by the pairing setting of Bluetooth. Because the mobile terminal 20 can communicate only with the vehicle to which the pairing setting is completed, it is not possible to obtain the loadage information of other vehicles, and safety is ensured.

Step of Obtaining the Sensor Signals

If the mobile terminal 20 sends a request to the in-vehicle communication unit 15 and the request demands the sending of the sensor signal at a predetermined sampling rate (e.g., 7 Hz), the mobile terminal 20 receives, via the respective mobile communication unit 21 and the in-vehicle communication unit 15, the calculated vehicle weight and the loadage, which are represented by the sensor signals issued from the loadage sensors of the four-wheel wheel. Since the sensor signals are directly relevant to safety, the sensor signals are set to the highest resolution and high sampling rate such that all the sensor signals are obtained with high accuracy.

Step of Calculating the Vehicle Weight, the Loadage and the Loading Deviation

The arithmetic processing unit 22 calculates the loading deviation, which is obtained by the calculation based on the numerical values of the vehicle specifications, the vehicle weight and the loadage.

Step of Displaying the Loadage Information Such as Vehicle Weight, Loadage, Loading Deviation, Etc. On the Display Screen The loadage information such as the vehicle specifications, the vehicle weight, the loading deviation, and the like is displayed on the screen. For example, as shown in FIG. 3, a plurality of pieces of loadage information, i.e., the sub-screen A for displaying the loads of the respective wheels and the center of gravity position of the vehicle (the total weight on all the wheels can also be displayed), the sub-screen B for displaying the total weight of the vehicle, the sub-screen C for displaying the text information such as the model type, the vehicle identification number (VIN), the vehicle specifications, etc., the sub-screen D for displaying the loadage relative to the maximum loading capacity, the sub-screen E for displaying the loading status (three stages of Good/Warning/Overload) and other information are displayed on the same large display screen.

Here, the fixed screen display information such as the display areas (arrangement layout) of the display screens 23a to 23d of the display unit 23, the schematic image of the vehicle, the loading status, the pointer image and so on are stored as the master images, and the master images are combined with the digital values of the loadage and the value indicated by the pointer on the graphic memory and are presented to the display unit 23.

Then, in order to display the updated information on the display screen in real time, the process returns to the "step of obtaining the sensor signals" until the application software is turned off, and this processing flow is repeated.

With this processing flow, it is possible to accurately confirm, on the screen of the mobile terminal 20, the loadage information such as the vehicle weight, loadage and loading deviation of the vehicle based on the sensor signals issued from the loadage sensors 13, 13, 13 and 13 of the four wheels 12, 12, 12 and 12.

Although certain embodiments have been described above, such embodiments are merely exemplary and are not intended to limit the scope of the present invention. The apparatus, device and method described herein may be embodied in other forms than as described above. In addition, it is also possible to appropriately make omissions, replacement (substitutions), modifications and changes to the above-described embodiment without departing from the scope of the present invention. Embodiments after such omissions, substitutions, modifications and changes are included within the scope of the claims and their equivalents and fall within the technical scope of the invention.

Industrial Applicability

The manner of displaying of the loadage information on the mobile terminal according to the present invention can be applied not only to small commercial vehicles but also to vehicles such as heavy-duty trucks and buses.

The invention claimed is:

1. An in-vehicle signal-sending device for communicating with a mobile terminal, the in-vehicle signal-sending device comprising:
   a sensor signal collecting unit connected to a plurality of sensors for collecting a sensor signal that represents vehicle loadage information in a vicinity of each wheel of the vehicle;
   an in-vehicle processor having a function of sending the sensor signal to the mobile terminal in response to a request from the mobile terminal; and
   a display for displaying a loading status of the vehicle loadage information in an analog format with a pointer-type instrument image and a loadage in a digital format with a numerical value such that the loading status in the analog format and the loadage in the digital format are simultaneously displayed in a same screen.

2. The in-vehicle signal-sending device according to claim 1, wherein communications between the in-vehicle signal-sending device and the mobile terminal are short-range communications.

3. A mobile terminal for communicating with an in-vehicle signal-sending device, the mobile terminal comprising:
an arithmetic processor for performing calculation processing;
a display for displaying on a screen thereof; and
a memory for storing screen display information,
the arithmetic processor having a function of calculating loading deviation based on vehicle specifications and vehicle loadage information represented by a sensor signal, and
the memory having a function of presetting the vehicle specifications, the loading deviation, and screen display information to be used to display the vehicle specifications and the loading deviation on the screen of the display,
wherein the display displays at least the vehicle specifications and the vehicle loadage information based on the screen display information, and
the display displays a loading status of the vehicle loadage information in an analog format with a pointer-type instrument image and displays a loadage in a digital format with a numerical value such that the loading status in the analog format and the loadage in the digital format are simultaneously displayed in a same screen.

4. The mobile terminal according to claim 3, wherein communications between the in-vehicle signal-sending device and the mobile terminal are short-range communications.

5. The mobile terminal according to claim 3, wherein a sampling rate of the sensor signal is between 0.5 Hz and 10 Hz.

6. The mobile terminal according to claim 3, wherein the memory stores a record of a loading status during traveling of the vehicle.

7. A loadage information display system comprising:
an in-vehicle signal-sending device; and
a mobile terminal communicating with the in-vehicle signal-sending device,
the in-vehicle signal-sending device including:
a sensor signal unit connected to a plurality of sensors for collecting a sensor signal that represents vehicle loadage information in a vicinity of each wheel of the vehicle; and
an in-vehicle processor for sending the sensor signal to the mobile terminal in response to a request from the mobile terminal,
the mobile terminal including:
an arithmetic processor for performing calculation processing;
a display for displaying on a screen thereof; and
a memory for storing screen display information,
the arithmetic processor having a function of calculating loading deviation based on vehicle specifications and the vehicle loadage information represented by the sensor signal,
the memory having a function of presetting the vehicle specifications, the loading deviation, and screen display information to be used to display the vehicle specifications and the loading deviation on the screen of the display,
wherein the display displays at least the vehicle specifications and the loadage information based on the screen display information, and
the display displays a loading status of the vehicle loadage information in an analog format with a pointer-type instrument image and displays a loadage in a digital format with a numerical value such that the loading status in the analog format and the loadage in the digital format are simultaneously displayed in a same screen.

* * * * *